United States Patent Office 2,875,164
Patented Feb. 24, 1959

2,875,164

SULFONIC ACID CATALYZED CELLULOSE ACETATE BUTYRATE UREA-FORMALDEHYDE COATING COMPOSITION FOR PAPER AND PROCESS OF PREPARATION

Fred M. Ball and Charles H. Coney, Kingsport, Tenn., assignors to Eastman Kodak Company, Rochester, N. Y., a corporation of New Jersey No Drawing. Application February 6, 1957
Serial No. 638,459

2 Claims. (Cl. 260—15)

This invention concerns catalyzed cellulose acetate butyrate coatings, in particular cellulose acetate butyrate coatings containing a urea-formaldehyde resin.

Hitherto, various resinous materials have been used as components in lacquer formulations. These have been selected on the basis of durability, expense of obtaining the resinous material, the compatibility with other lacquer components, solubility in relatively inexpensive organic solvents and the like. Cellulose acetate butyrate has been widely accepted as an organic plastic material which is particularly adaptable as a lacquer component due to its particularly satisfactory characteristics.

Although the characteristics of lacquer based on cellulose acetate butyrate are notably good, it has been desired to improve certain properties such as scuff resistance, resistance to abrasion, and the like. For this purpose various other components have been added to lacquers such as certain alkyl resins, urea-formaldehyde resins, polyvinyl resins and the like. The addition of these resinous, however, presents additional problems particularly in respect to urea-formaldehyde resins.

It has been customary when using urea-formaldehyde resins, to bake the object which has been coated with the lacquer at 350° F. for from 10 to 15 minutes. The addition of an acidic catalyst reduces this baking period and permits the temperature to be as low as 250° F. Therefore, in preparing a lacquer which may be used for coating a paper surface, it is necessary to use an acidic catalyst, since it is not considered suitable to use a temperature as high as 350° F. or a time longer than 60 seconds. However, the use of an acidic catalyst causes the urea-formaldehyde resin to harden at room temperatures and, therefore, makes these coating compositions difficult to handle, particularly if the coating composition sets up during the coating process, gums up the coating apparatus or is allowed to remain in the hoppers or mixing tanks for any length of time. Even before the solution sets up there is an interval during which the solution may produce films with reduced gloss. Obviously, it would not be practical to allow such a coating composition to remain in the coating equipment over a weekend or, in some instances, to allow it to remain overnight.

In view of the above difficulties, it has long been desired to prepare a coating composition based on cellulose acetate butyrate and containing a urea-formaldehyde resin which would be stable at room temperatures for a reasonable length of time, which could be coated on paper to provide a hard coating without requiring a heating treatment at a temperature as high as 350° F., and which could be cured within a few seconds instead of several minutes.

We have discovered an acidic catalyst which can be used with urea-formaldehyde coatings and which provides stability. We have also provided a coating composition which can be used on paper, particularly inked paper, to provide an attractive lacquer with a high gloss and with good resistance to abrasion and the like.

One object of this invention is to provide a new acidic catalyst for urea-formaldehyde resin-containing coatings. Another object is to provide a catalyzed cellulose acetate butyrate paper lacquer. An additional object is to provide a method of stabilizing and catalyzing a urea-formaldehyde lacquer. A further object is to provide a process for improving the properties of a cellulose acetate butyrate based lacquer particularly adapted for coating on paper surfaces.

We have found a method of catalyzing urea-formaldehyde resins by which the catalyst has reduced activity in the resin solution at room temperature. However, the activity of the catalyst at elevated temperatures is unaffected. This means that the catalyst may be added to the resin solution without affecting its stability over a period of several days rather than several hours, yet upon heating the resin, the catalyst will become active causing the resin to polymerize within a very short period.

A mixed alkane sulfonic acid having a general formula $RSO_3H$ in which R is methyl, ethyl or propyl, mixed, is used as the acid which has extremely good catalytic activity for the curing of urea-formaldehyde resins. By adding an equal weight of a lower molecular weight monohydric alcohol, such as normal-butyl alcohol, to the mixed alkane sulfonic acid, and using this modified acid catalyst, the stability of the thus catalyzed urea-formaldehyde resin is increased manyfold without any significant increase in the length of time required at an elevated temperature for polymerization of the resin.

Alcohols which may be used to modify the mixed alkane sulfonic acid are lower aliphatic alcohols such as methyl, ethyl, isopropyl, propyl, butyl, isobutyl, secondary-butyl, tertiary-butyl alcohols and the like. However, normal-butyl alcohol is superior to other alcohols.

We have also discovered that a cellulose acetate butyrate paper coating may be formulated using this modified sulfonic acid catalyst and a urea-formaldehyde resin. This lacquer has an unusual combination of properties and in addition to the above components also contains poly-α-methyl styrene and a silicone fluid. The limits on a nonvolatile basis are as follows:

| Components: | Percent by weight |
|---|---|
| Cellulose acetate butyrate having a butyryl content 35-39%, acetyl content 12-14% and hydroxyl content of 1-1.5% | 30-40 |
| Urea-formaldehyde resin | 20-50 |
| Poly-α-methyl styrene | 20-30 |
| Modified sulfonic acid catalyst | 0.4-2 |

Our preferred embodiment of this invention is illustrated as follows in Example 1. However, these examples are intended for illustration purposes only and are not intended to limit the scope of our invention.

EXAMPLE 1.—Part A

| Components: | Percent by weight |
|---|---|
| Cellulose acetate butyrate, 35-39% butyryl content, 12-14% acetyl content and 1-1.5% hydroxyl content | 15 |
| Butylated urea-formaldehyde resin (60% solution) in 60:40 xylene-butanol and having an acid number of 3-8 | 25 |
| Poly-α-methyl styrene | 10 |
| Phenylated dimethyl polysiloxane | 0.05 |
| Toluene | 13.75 |
| Ethyl alcohol | 20 |
| Isobutyl acetate | 15.6 |

Part B

| | |
|---|---|
| Modified sulfonic acid catalyst | 0.6 |
| | 100.00 |

Part B was added to Part A just prior to application. The lacquer then had several days' solution stability. A portion of this lacquer was coated on an inked paper surface and dried for 15 seconds at 285° F. This lacquer had excellent adhesion to the paper surface.

Coated papers were then placed coated side to coated side under a pressure of 2 pounds per square inch at a temperature of 350° F. for a period of 60 minutes without showing any indication of blocking. These coatings were exposed to 100 hours of ultraviolet light in a Fade-O-Meter without color change. In addition, the film had very good resistance to soap and strong alkali solutions. The coatings also had excellent scuff and mar resistance, and a high degree of resistance to solvents such as methylene chloride.

EXAMPLE 2

A lacquer having the following composition was prepared:

Part A

| Components: | Percent by weight |
| --- | --- |
| Cellulose acetate butyrate, 35–39% butyryl content, 12–14% acetyl content and 1–1.5% hydroxyl content | 15 |
| Butylated urea-formaldehyde resin in a 60% solution in 60:40 xylene butanol solution | 25 |
| Poly-α-methyl styrene | 10 |
| Dimethyl phthalate | 10 |
| Phenylated dimethyl polysiloxane | 0.05 |
| Toluene | 1.75 |
| Ethyl alcohol | 15 |
| Isobutyl acetate | 12.6 |

Part B

| | |
| --- | --- |
| Modified sulfonic acid catalyst | 0.6 |
| | 100.00 |

This coating was applied to inked paper, air-dried for 10 seconds, then cured at 275° F. for 15 seconds, thereby producing a glossy abrasion-resistant lacquer with good adhesion. The combination of good flexibility, high degree of mar resistance, and resistance to heat and solvents made this coating and that illustrated in Example 1 outstanding.

EXAMPLE 3

The following solutions were prepared:

Part A

| Components: | Percent by weight |
| --- | --- |
| Cellulose acetate butyrate, 35–39% butyryl content, 12–14% acetyl content and 1–1.5% hydroxyl content | 15 |
| Butylated urea-formaldehyde resin in a 60% solution in 60:40 xylene butanol solution | 25 |
| Poly-α-methyl styrene | 10 |
| Toluene | 13.8 |
| Ethyl alcohol, anhydrous | 20 |
| Isobutyl acetate | 15.6 |

Part B

| | |
| --- | --- |
| Modified sulfonic acid catalyst | 0.6 |
| | 100.0 |

After a homogeneous solution was obtained with the ingredients in Part A, the catalyst of Part B was added. The lacquer was then cast on printed paper, air-dried for 10 seconds, then cured at 275° F. for 15 seconds, thereby producing a glossy, abrasion-resistant lacquer with good adhesion.

A similar lacquer was prepared in which a mixed alkane sulfonic acid catalyst was added instead of the modified sulfonic acid catalyst. The solution was stable for only approximately 6 hours as compared to the stability of the solution using the modified sulfonic acid catalyst which was stable for a period of 5 days.

EXAMPLE 4

The following composition was made:

Part A

| Component: | Percent by weight |
| --- | --- |
| Butylated urea-formaldehyde resin (100%) | 98 |
| Modified sulfonic acid catalyst | 2 |
| | 100 |

This composition was applied to printed paper and tin plate, air-dried, and baked at 275° F. for 15 seconds. A clear, adherent coating with excellent surface hardness and abrasion resistance was obtained. The solution had a stability of over 22 days, whereas with a similar solution containing 1 percent mixed alkane sulfonic acid to 99 percent of the butylated urea-formaldehyde resin, the solution stability obtained was less than 15 days.

Use of butylated urea-formaldehyde resins catalyzed using the modified sulfonic acid catalyst produces a lacquer which has superior stability characteristics and in addition results in a finished film which has unusually good properties. The lacquer solutions prepared according to the above examples were water-white and the film imparted no color to bleached white paper stock.

Other components than those illustrated may be added to the lacquer solutions without departing from the scope of our invention. For instance, the addition of 5 to 10 percent dimethyl-phthalate may be used to increase the flexibility of these compositions without appreciably reducing scuff resistance. This plasticizer also tends to increase gloss. Paraffin wax, at approximately 0.5 percent of the total of the dry weight, reduces the moisture vapor transmission by approximately 50 percent without affecting the clarity of the film. Although the examples show the use of these lacquers for paper, it should be obvious to one skilled in the art that these coatings are also applicable to plastics, metals and the like in addition to wood and paper where resistance to solvent and heat is desirable. Wherever the term urea-formaldehyde resin is used herein, it is intended to include amino-aldehyde condensation products such as melamine-urea-formaldehyde resins, butylated urea-formaldehyde resins, and the like.

With the use of the modified sulfonic acid catalyst, a curing temperature as low as 80° C. may be used to insolubilize the laquer coating. The use of much higher temperatures and a shorter length of time may be preferable for use in coating paper where speed through a heated area is essential.

The cellulose acetate butyrate which may be used as a basis for the lacquer combined with a urea-formaldehyde resin may have a range from 0.4–2.2 hydroxyl content, 20–55% butyryl content and an acetyl content of 0–30. In other words, cellulose tributyrate may be used as well as cellulose acetate butyrate with a very low acetyl content.

Although various amino-aldehyde resins are operative in our invention, the preferable resin is a butylated urea-formaldehyde resin which contains 5–6 urea groups per molecule and which has a nitrogen content of approximately 17%.

A suitable material was prepared as follows:

One part by weight of urea was added to a mixture of 5 parts by weight of formalin [40% formaldehyde] and 9 parts by weight of n-butyl alcohol. These were stirred at room temperature until a homogeneous solution was obtained, then refluxed for one hour at 105–110° C. and refluxing for an additional 4 hours during which time the water of condensation was continuously removed by the use of a gravity water trap. After 42 cc. of water were removed, the solution was filtered. This gave a resin with approximately 60% nonvolatile.

Our preferred embodiment may contain a ratio of 1:2 moles of formaldehyde and 0.5–2 moles of butanol to each mole of urea.

The poly-α-methyl styrene which we use in our paper lacquer is a low molecular weight polymer having viscosity of 600–1100 cps. at 60° C.

The mixed alkane sulfonic acid which was modified according to our invention was a mixture of methyl, ethyl and propyl sulfonic acids having an average molecular weight of 110. However, it would not be necessary that all three of these alkane sulfonic acids be present, but that the composition might be varied within the following limits:

| | Percent |
|---|---|
| Methane sulfonic acid | 0–50 |
| Ethane sulfonic acid | 0–100 |
| Propane sulfonic acid | 0–100 |

We claim:

1. A lacquer containing 30–40% by weight solids basis cellulose acetate butyrate, 20–50% by weight solids basis partially polymerized butylated urea-formaldehyde in a xylene-butanol solution, 20–30% by weight solids basis poly alpha methyl styrene, a solvent mixture containing toluene, anhydrous ethyl alcohol, and isobutyl acetate, and a modified sulfonic acid catalyst containing a mixture of methyl, ethyl and propyl sulfonic acids dissolved in about an equal amount by weight of n-butyl alcohol.

2. A process for making a stabilized catalyst lacquer comprising mixing 20–40% by weight solids basis cellulose acetate butyrate, 20–50% by weight solids basis partially polymerized butylated urea formaldehyde resin in a xylene-butanol solution, 20–30% by weight solids basis poly alpha methyl styrene, with a solvent mixture containing toluene, anhydrous ethyl alcohol, and isobutyl acetate and adding thereto a modified sulfonic acid catalyst containing a mixture of methyl, ethyl, and propyl sulfonic acids dissolved in about an equal amount by weight of butyl alcohol.

References Cited in the file of this patent

UNITED STATES PATENTS

| 2,196,751 | Dickey et al. | Apr. 9, 1940 |
| 2,227,708 | Cordier | Jan. 7, 1941 |
| 2,327,738 | Perry | Aug. 24, 1943 |
| 2,631,138 | Dannenberg | Mar. 10, 1953 |

FOREIGN PATENTS

| 709,078 | Great Britain | May 12, 1954 |